(12) United States Patent
Hata

(10) Patent No.: US 7,501,714 B2
(45) Date of Patent: Mar. 10, 2009

(54) ENGINE STARTING SYSTEM

(75) Inventor: Toshiaki Hata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 877 days.

(21) Appl. No.: 11/100,382

(22) Filed: Apr. 7, 2005

(65) Prior Publication Data

US 2006/0106525 A1    May 18, 2006

(30) Foreign Application Priority Data

Nov. 12, 2004    (JP) ............................. 2004-329344

(51) Int. Cl.
- B60R 25/04 (2006.01)
- E05B 17/00 (2006.01)
- H01H 27/00 (2006.01)

(52) U.S. Cl. .................................... 307/10.3

(58) Field of Classification Search ............... 307/10.2, 307/10.3, 10.4, 10.6; 340/426.13, 426.16, 340/246.17; 701/113
See application file for complete search history.

(56) References Cited

U.S. PATENT DOCUMENTS

2005/0029871 A1 * 2/2005 Mori et al. ................ 307/10.3

FOREIGN PATENT DOCUMENTS

| JP | 04-015141 A | 3/1992 |
| JP | 2002-283965 A | 10/2002 |
| JP | 2003-301764 A | 10/2003 |
| JP | 2004-116176 A | 4/2004 |

* cited by examiner

*Primary Examiner*—Stephen W Jackson
*Assistant Examiner*—Carlos Amaya
(74) *Attorney, Agent, or Firm*—Sughrue Mion, PLLC

(57) ABSTRACT

To dispense with a key cylinder and permit or stop operation of an engine with ease, an engine starting system of the present invention comprises a power source activation unit, an engine control unit, a propelled-object-side equipment, a steering wheel locking unit, a switch, and a portable equipment. The portable equipment includes a transmitter-receiver, a memory circuit, and a control circuit. The propelled-object-side equipment includes a transmitter-receiver, a memory circuit, and a control circuit. The propelled-object-side equipment transmits an inquiry signal to the portable equipment in response to an actuation signal of the switch, and the portable equipment transmits an answer signal corresponding to the inquiry signal. If the answer signal corresponds to the inquiry signal, the control circuit unlocks the steering wheel locking unit, permits the engine to be started, and performs various operations depending on how many times and how long the switch is actuated.

8 Claims, 6 Drawing Sheets

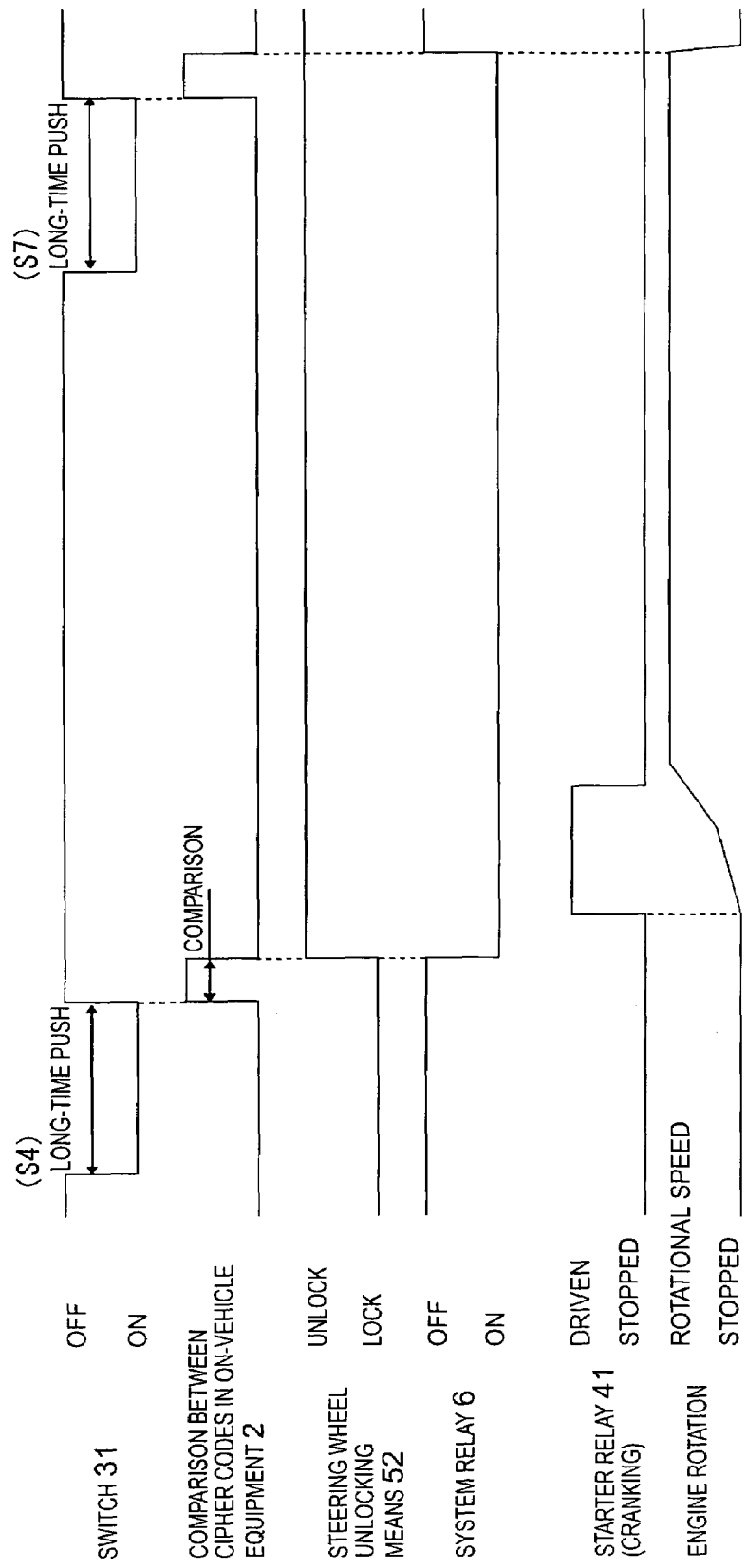

ENGINE STARTING SYSTEM

BACKGROUND OF THE INVENTION

1. Field of the Invention

The present invention relates to an engine starting system applied to a propelled object (e.g., two-wheeled vehicle, four-wheeled vehicle, ATV (All Terrain Vehicle), marine vessel, or jet-propelled launch) such as a vehicle that is mounted with an engine (internal combustion engine) to be propelled thereby. In particular, the present invention relates to an engine starting system with an antitheft effect as well as simplified structure and actuation.

2. Description of the Related Art

Conventionally, to start a vehicle's engine, a key switch for starting the engine is mechanically turned on by use of a cylinder key possessed by an authorized driver of the vehicle alone. Accordingly, starting the engine is impossible without an authorized key, thereby producing an antitheft effect for the vehicle. However, even though theft of the vehicle is to be prevented by relying on the key, it is not always possible to attain a sufficient antitheft effect because the key can relatively easily be duplicated.

Thus, there is proposed a system for enhancing the antitheft effect in which the information specifying a key for the vehicle is sent from the key to the key cylinder, and the key cylinder identifies the information sent from the key and permits the start of engine only if the information is identified as authorized information (see JP 04-15141 B, for example).

Specifically, a pair of magnetic circuits are structured by disposing an annular core, around which a rotor coil is wound, in the periphery of a key insertion hole on the key cylinder, and by providing an axial core, around which a key coil is wound, inside the key to bring the axial core into the proximity of the annular core, whereby the information for driving the engine is passed via the pair of magnetic circuits between the key and the key cylinder.

Although the conventional engine starting system attains some effect to prevent the theft of a vehicle but has a problem in that a driver needs to insert and turn a key into the key cylinder which also serves as an electrical switch.

There is also another problem in that a mechanical failure is likely to occur as it is necessary to insert and turn a key into the key cylinder.

Also, there is a problem in that there are no antitheft precautions provided for when the driver leaves the vehicle with the key inserted into the key cylinder.

Also, in starting the engine at night, the driver cannot see an insertion hole for the key cylinder in the darkness, therefore taking a long time to start the engine.

To solve this problem of starting the engine at night, such a measure as placing a lamp on the key cylinder may be taken. However, in the case of inexpensive two-wheeled vehicle especially, there is a problem in that installing the lamp increases the cost.

Moreover, the design in proximal area of the driver's seat is restricted due to the existence of the key cylinder.

SUMMARY OF THE INVENTION

The present invention has been made in order to solve the above-mentioned problems, and has an object to provide an engine starting system that dispenses with a key and a key cylinder and permits or stops operation of an engine with ease.

According to an aspect of the present invention, an engine starting system for authentically starting an engine installed in a propelled object, includes: power source activation means installed in the propelled object; an engine control unit; a propelled-object-side equipment; steering wheel locking means; alarm means; a switch that can be actuated manually; and a portable equipment possessed by a driver of the propelled object. The portable equipment includes: a portable transmitter-receiver for establishing bidirectional communication with the propelled-object-side equipment; a portable-equipment-side memory circuit in which a proper cipher code corresponding to the propelled object is stored; and a portable-equipment-side control circuit that receives a signal transmitted from the propelled-object-side equipment, reads out the cipher code, and transmits the cipher code to the propelled-object-side equipment. The propelled-object-side equipment includes: a propelled-object-side transmitter-receiver for establishing bidirectional communication with the portable equipment; a propelled-object-side memory circuit in which a proper cipher code corresponding to the propelled object is stored as a collation code; and a propelled-object-side control circuit that reads out the collation code in response to an actuation signal of the switch, transmits the collation code to the portable equipment, and controls the engine control unit, the steering wheel locking means, and the alarm means in accordance with a result of comparison between the cipher code received from the portable equipment and the collation code. The propelled-object-side transmitter-receiver transmits an inquiry signal including the collation code to the portable transmitter-receiver in response to an actuation signal of the switch. The portable transmitter-receiver transmits an answer signal including the cipher code corresponding to the inquiry signal to the propelled-object-side transmitter-receiver. The propelled-object-side control circuit unlocks the steering wheel locking means and permits the engine to be started if the answer signal corresponds to the inquiry signal. The propelled-object-side control circuit unlocks the steering wheel locking means, turns the power source activation means ON, or performs a cranking operation by the engine control unit depending on how many times and how long the switch is actuated.

The present invention makes it possible to simplify the system configuration and permit or stop operation of the engine with ease while dispensing with a key and a key cylinder.

BRIEF DESCRIPTION OF THE DRAWINGS

FIG. 6 is a timing chart showing how the engine starting system according to the first embodiment of the present invention operates when the switch is pushed for a long time.

DESCRIPTION OF THE PREFERRED EMBODIMENT

First Embodiment

A first embodiment of the present invention will be described hereinafter in detail with reference to the drawings.

Figure 1:
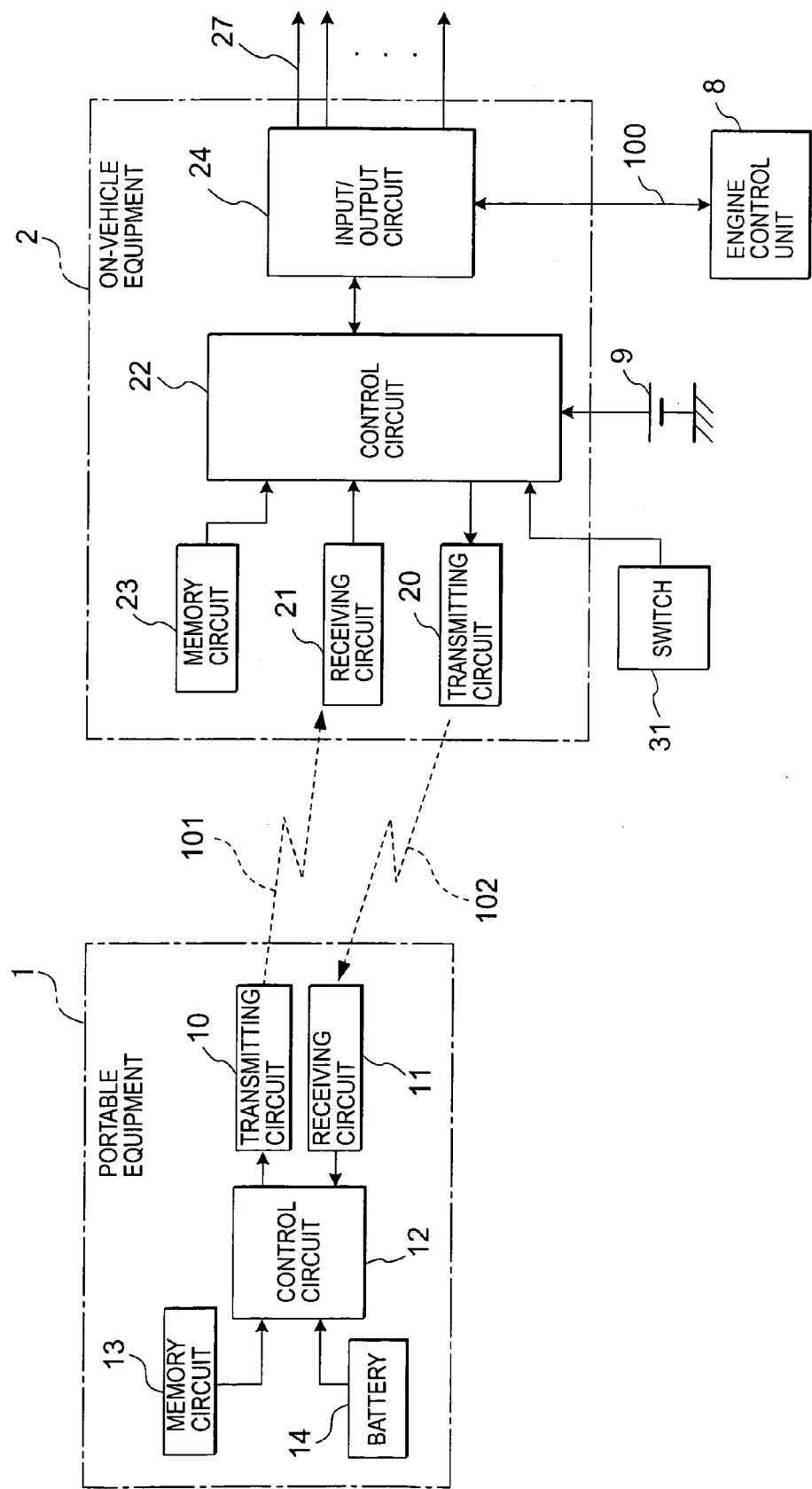
FIG. 1 is a block diagram schematically showing an engine starting system according to a first embodiment of the present invention.

FIG. 1 is a block diagram schematically showing the overall structure of an engine starting system for a vehicle or the like according to the first embodiment of the present invention. Illustrated in FIG. 1 is an example in which the present invention is applied to a two-wheeled vehicle.

Referring to FIG. 1, the engine starting system includes a portable equipment 1 constituting a portable transmitter-receiver and an on-vehicle equipment 2 constituting a vehicle-side transmitter-receiver.

The portable equipment 1, which is possessed by an authorized driver (user), includes a transmitting circuit 10, a receiving circuit 11, a control circuit 12, a memory circuit 13 in which a cipher code is stored, and a battery 14 serving as a power source.

The control circuit 12 operates by being supplied with power from the battery 14, reads the cipher code from the memory circuit 13, and carries out radio communication with the on-vehicle equipment 2 via the transmitting circuit 10 and the receiving circuit 11.

On the other hand, the on-vehicle equipment 2 installed in the vehicle includes a transmitting circuit 20, a receiving circuit 21, a control circuit 22, a memory circuit 23 in which a cipher code for collation (hereinafter referred to as "the collation code") is stored, and an input/output circuit 24.

The control circuit 22 operates by being supplied with power from an on-vehicle battery 9, reads the collation code from the memory circuit 23, and carries out radio communication with the portable equipment 1 via the transmitting circuit 20 and the receiving circuit 21.

The portable equipment 1 and the on-vehicle equipment 2 exchange radio communication signals 101 and 102 with each other via the transmitting and receiving circuits 10 and 11 and the transmitting and receiving circuits 20 and 21.

A switch 31 constructed as an external actuating button in the vehicle is connected to the control circuit 22 in the on-vehicle equipment 2. In response to an actuation signal of the switch 31, the control circuit 22 calculates a control signal 27 based on a driving state and a collation result, and outputs the control signal 27 to an external relay or the like (which will be described later) via the input/output circuit 24.

The input/output circuit 24 is connected to an engine control unit 8 via a communication line 100.

Figure 2:
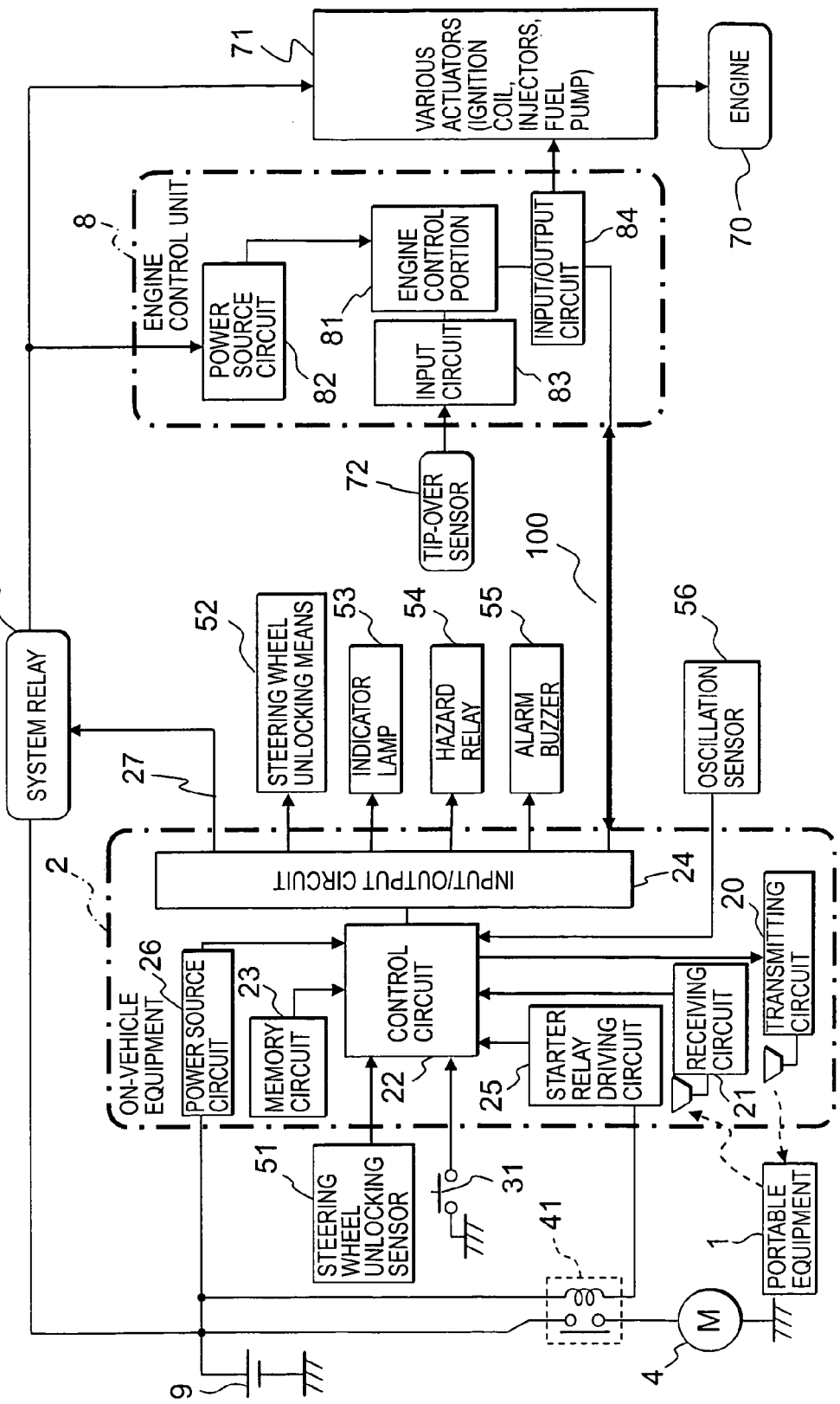
FIG. 2 is a block diagram concretely showing an on-vehicle equipment and its peripheral equipments according to the first embodiment of the present invention.

FIG. 2 is a block diagram which concretely shows the structure of the on-vehicle equipment 2 in FIG. 1 in relation to the engine control unit 8 and peripheral equipments.

Referring to FIG. 2, connected to the on-vehicle equipment 2 are a system relay 6, a starter relay 41 for energizing a starter (motor) 4 from the on-vehicle battery 9, a steering wheel unlocking sensor 51, a steering wheel unlocking means 52, an indicator lamp 53 for indicating various kinds of information, a hazard relay 54 for triggering an alarm, an alarm buzzer 55, and an oscillation sensor 56 for detecting a theft, as well as the aforementioned components such as the engine control unit 8, the on-vehicle battery 9, and the switch 31.

A sensor group and a relay group including the system relay 6, the starter relay 41, and the like constitute the peripheral equipments of the on-vehicle equipment 2.

The on-vehicle equipment 2 comprises, in addition to the respective circuits 20 to 24 mentioned above, a starter relay driving circuit 25 for driving the starter relay 41 and a power supply circuit 26 connected to the on-vehicle battery 9 to supply power to the control circuit 22.

The starter relay driving circuit 25, the steering wheel unlocking sensor 51, and the oscillation sensor 56 are connected to the control circuit 22 in the on-vehicle equipment 2.

The control signal 27 from the input/output circuit 24 is input to the system relay 6, the steering wheel unlocking means 52, the indicator lamp 53, the hazard relay 54, and the alarm buzzer 55.

The engine control unit 8, which includes an engine control portion 81, a power supply circuit 82 connected to the engine control portion 81, an input circuit 83, and an input/output circuit 84, drivingly controls an engine 70 via various actuators (an ignition coil, injectors, a fuel pump, and the like) 71.

In the engine control unit 8, the power supply circuit 82 is connected to the on-vehicle battery 9 via the system relay 6 and supplies power to the engine control portion 81.

A tip-over sensor 72 is connected to the input circuit 83, and the various actuators 71 are connected to the input/output circuit 84.

The engine control unit 8 and the various actuators 71 are supplied with power from the on-vehicle battery 9 via the system relay 6.

The input/output circuit 84 in the engine control unit 8 is connected to the input/output circuit 24 in the on-vehicle equipment 2 via the communication line 100 permitting bidirectional communication.

Figure 3:
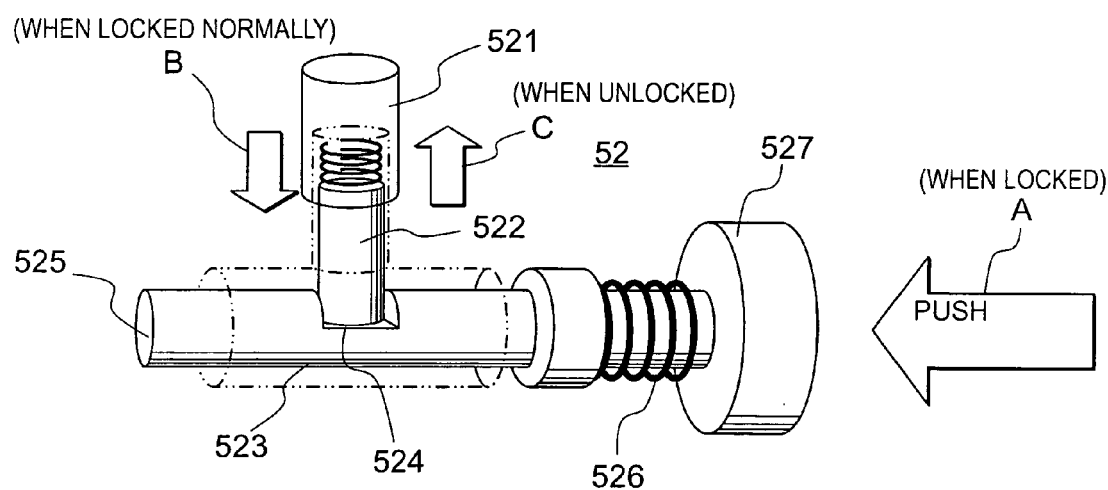
FIG. 3 is a perspective view showing a concrete structural example of a steering wheel locking means according to the first embodiment of the present invention.

FIG. 3 is a perspective view showing a concrete structural example of the steering wheel unlocking means 52 in FIG. 2, which is designed for use in a two-wheeled vehicle.

Referring to FIG. 3, the steering wheel unlocking means 52 includes an electromagnetic solenoid 521 energized at the time of an unlocking operation, a stopper 522 serving as an operating portion of the electromagnetic solenoid 521, a lock bar 523 engaging the stopper 522, a catch portion (recess) 524 formed in a central upper face of the lock bar 523, an operating end portion 525 of the lock bar 523, a spring 526 urging the lock bar 523 in an unlocking direction (to the right in FIG. 3), and a lock button 527 serving as an actuating portion of the lock bar 523.

When a steering wheel is locked, the stopper 522 of the electromagnetic solenoid 521 is caught in the catch portion 524 of the lock bar 523, and the operating end portion 525 of the lock bar 523 is caught in a rotational member (not shown) of the steering wheel, which is thus locked in its rotational direction.

In the engine starting system shown in FIGS. 1 and 2, the on-vehicle equipment 2 transmits an inquiry signal (trigger signal) 102 from the transmitting circuit 20 in response to an actuation signal of the switch 31. The portable equipment 1 possessed by the driver then receives the inquiry signal 102 from the on-vehicle equipment 2, and returns an answer signal 101 for the inquiry signal 102 to the on-vehicle equipment 2.

The control circuit 22 in the on-vehicle equipment 2 thereby determines whether or not the answer signal 101 received from the portable equipment 1 corresponds to the inquiry signal 102.

If it is determined that the answer signal 101 is authentic, the control circuit 22 generates and outputs the control signal 27 for unlocking from the input/output circuit 24, drives the steering wheel unlocking means 52, unlocks the steering wheel of the vehicle, and permits the engine 70 to be started.

At this moment, only by repeatedly actuating (pushing) the single switch (button) 31 attached to the vehicle, the steering wheel unlocking means 52 is driven, the system relay 6 is turned ON, power supply circuits (vehicular power sources) 26 and 82 supplied with power from the on-vehicle battery 9 are activated (the power source for the system is turned ON), and a cranking means is driven (the engine 70 is started).

A short-time repetitive actuation (ON/OFF) or a long-time continuous actuation (ON in succession) can be selected as an actuation mode of the switch 31.

For example, if a sequential shift of control is made through the short-time repetitive actuation of the switch 31, a determination on authenticity is made by the inquiry signal 102 and the answer signal 101 every time the switch 31 is actuated.

Further, if a continuous shift of control is made through the long-time actuation of the switch 31, a determination on authenticity is made by the inquiry signal 102 and the answer signal 101 at the first time only.

Still further, the control of turning the power source of the system OFF (stopping the engine 70) via the system relay 6 can also be performed by actuating the switch 31.

Concrete operations of the respective circuits shown in FIGS. 1 and 2 will now be described.

First of all, if the driver (user) possessing the authenticated portable equipment 1 enters the vehicle and actuates the switch 31, the control circuit 22 in the on-vehicle equipment 2 reads the collation code from the memory circuit 23, and transmits by radio a trigger signal for cipher collation as the inquiry signal 102 via the transmitting circuit 20.

At this moment, if the driver (user) possessing the portable equipment 1 exists within a transmission range of the on-vehicle equipment 2, the receiving circuit 11 in the portable equipment 1 receives the inquiry signal (trigger signal) 102.

Even if someone who does not possess the portable equipment 1 has actuated the switch 31, communication, collation, or the like of signals does not occur.

The control circuit 12 in the portable equipment 1 then refers to the collation code included in the inquiry signal 102 and determines whether to transmit a cipher code or not.

The determination processing performed herein can be replaced with a processing of determining whether or not a so-called ID code has been received. In other words, the control circuit 12 can respond only to the collation code transmitted from the driver's own vehicle by determining from which vehicle the collation code received from the on-vehicle equipment 2 has been transmitted.

If it is determined that the received collation code has been transmitted from the driver's own vehicle, the control circuit 12 invokes the cipher code from the memory circuit 13 and transmits it by radio as the answer signal 101 via the transmitting circuit 10.

The battery 14 in the portable equipment 1 is a power supply source for operating the respective circuit portions. Until the subsequent inquiry signal 102 is received after the answer signal 101 has been transmitted, the battery 14 waits to receive the inquiry signal 102 in a low-consumption mode to prevent power consumption in the power supply source.

In order to make power supply possible by activating the battery 14 upon receiving the inquiry signal 102, the battery 14 is designed as an energy-efficient battery capable of restraining power consumption.

The on-vehicle equipment 2 receives the answer signal 101 (including the cipher code) from the portable equipment 1 via the receiving circuit 21. The control circuit 22 in the on-vehicle equipment 2 invokes the collation code stored in the memory circuit 23 and collates it with the received cipher code.

If, for example, the steering wheel has been locked when it is determined as a result of collation that the collation code coincides with the cipher code, the control circuit 22 outputs the control signal 27 for "unlocking" from the input/output circuit 24.

If the user actuates the switch 31 again at this moment, the collation of ID codes is carried out as described above.

If it is determined as a result that the ID codes (the cipher code and the collation code) coincide with each other, the control circuit 22 in the on-vehicle equipment 2 generates and outputs the control signal 27 from the input/output circuit 24, turns the system relay 6 ON, and activates the engine control unit 8.

The control circuit 22 outputs an engine start permitting signal to the engine control unit 8 via the communication line 100.

If the cipher code and the collation code do not coincide with each other, the control signal 27 is not generated from the on-vehicle equipment 2 and the system relay 6 is not turned ON.

Further, as described above, the steering wheel unlocking sensor 51 for detecting the unlocking of the steering wheel is connected to the control circuit 22.

Still further, connected to the input/output circuit 24 are the steering wheel unlocking means 52 for unlocking the steering wheel, the indicator lamp 53 indicating various kinds of information (e.g., an abnormality in the steering wheel unlocking means 52, an abnormality in activation of the engine control unit 8, a warning at the time of a theft), the hazard relay 54 issuing the same kinds of warnings (e.g., using a flasher lamp to provide an answer back indication in response to the coincidence between collation results or driving the flasher lamp to emit flashes of light as a warning at the time of a theft), the alarm buzzer 55 issuing warning sound at the time of a theft, and the oscillation sensor 56 sensing the occurrence of a theft by detecting oscillation of the vehicle when the engine is not allowed to operate.

Furthermore, the engine control portion 81 in the engine control unit 8 (the means for controlling the operation of the engine 70) outputs a drive signal corresponding to an operation state of the engine 70 via the input/output circuit 84, actuates the various actuators 71, and prohibits the operation of the engine 70.

In addition to the tip-over sensor 72 for detecting tip-over of the vehicle, various sensors (not shown) for detecting driving states (intake air temperature, engine coolant temperature, intake air amount, and the like) necessitated to control the engine are connected to the engine control portion 81.

An unlocking operation performed by the steering wheel unlocking means 52 in response to the coincidence between collation results will now be described.

Referring to FIG. 3, if power is supplied to the electromagnetic solenoid 521 to release the stopper 522 caught in the catch portion 524 of the lock bar 523 in the direction indicated by an arrow, the lock bar 523 moves toward the lock button 527 due to a restoring force of the spring 526. Then, the operating end portion 525 is released from the rotational member (not shown) of the steering wheel, whereby the unlocking operation is completed. It is to be noted herein that the steering wheel is locked manually by pushing the lock button 527.

Figure 4:
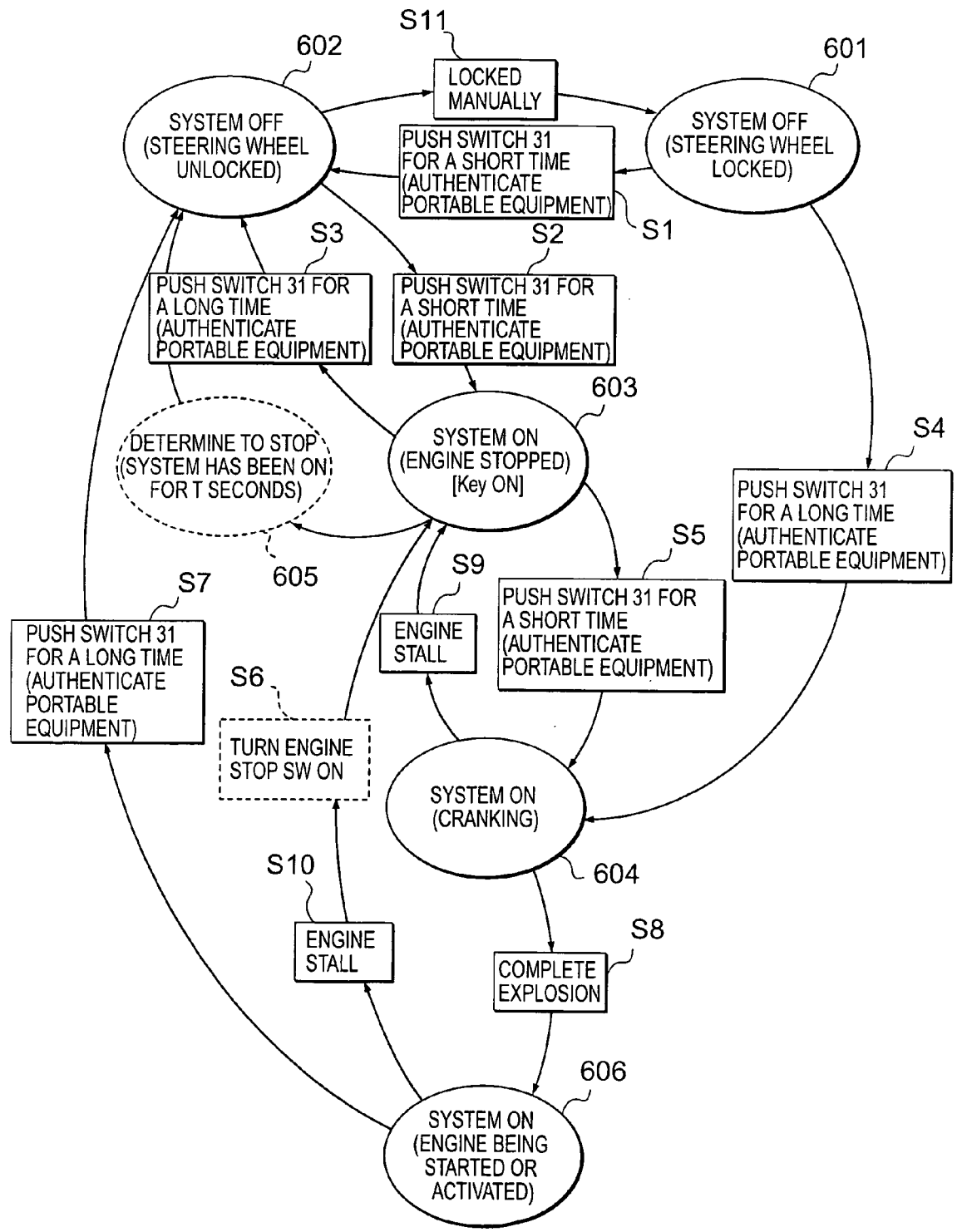
FIG. 4 is an explanatory diagram as a flowchart showing state transitions during operation of the engine starting system according to the first embodiment of the present invention.

Referring to FIG. 4 as well as FIGS. 1 to 3, it will now be described how the driver unlocks the steering wheel and activates the engine 70.

FIG. 4 is an explanatory diagram showing state transitions during operation of the system according to the first embodiment of the present invention. A flowchart in this drawing shows how the specialized system operation in the two-wheeled vehicle shifts from a steering wheel unlocking mode to the permission of the operation of the engine 70 through an engine starting mode.

Referring to FIG. 4, first of all, the system is OFF in its initial state (when the steering wheel is locked) (step 601).

If the switch 31 is pushed for a short time, the control circuit 22 in the on-vehicle equipment 2 responds thereto and compares the cipher code received from the portable equipment 1 with the collation code to authenticate the portable equipment 1 (step S1).

If it is determined in step S1 that the cipher code coincides with the collation code, the steering wheel is unlocked with the system being OFF (step 602).

On the other hand, if it is determined that the cipher code does not coincide with the collation code, the current mode, that is, the OFF state of the system (step 601) is maintained.

In addition, if the switch 31 is pushed for a short time with the steering wheel being unlocked (step 602), the control circuit 22 in the on-vehicle equipment 2 compares again the cipher code received from the portable equipment 1 with the collation code and authenticates the portable equipment 1 (step S2).

If it is determined in step S2 that the cipher code coincides with the collation code, the control circuit 22 activates the system relay 6.

The system is thereby turned ON (while the engine 70 is still stopped) (step 603).

At this moment, the engine control unit 8 starts up, and at the same time, the control circuit 22 delivers an engine start permitting signal to the engine control unit 8 via the communication line 100 and thus permits the various actuators 71 to be started.

If it is desired to return the system from ON (step 603) to OFF, the switch 31 is pushed for a long time (the portable equipment 1 is authenticated) (step S3).

In response, the control circuit 22 stops driving the system relay 6, and as a result, the system is turned OFF again (step 602).

If the system is left to remain ON (step 603), the on-vehicle equipment 2 stops driving the system relay 6 after the lapse of a predetermined period of time T [seconds] (e.g., 600 seconds) (step 605) and shifts the system to the OFF mode (step 602).

On the other hand, if the switch 31 is pushed again for a short time (step S5) with the system being ON (step 603), the control circuit 22 turns the starter relay 41 ON via the starter relay driving circuit 25.

The starter 4 is thereby driven over a predetermined period of time Ts [seconds] (e.g., 3 seconds). Thus, the engine 70 can be cranked with the system being ON (step 604).

If the engine 70 has gone through an explosion stroke immediately after the lapse of the predetermined period of time Ts (3 seconds) or within the predetermined period of time Ts (step S8), it is started or activated with the system being ON (step 606).

When it is desired to stop only rotation of the engine 70, stoppage of the engine can be realized by turning a kill switch, that is, an engine stop SW (not shown) ON (step S6).

On the other hand, if engine stall has occurred (step S9 or S10) with the system being ON (step 604) or with the engine 70 being started or activated (cranked) (step 606), the engine is stopped again with the system being ON (step 603).

If it is desired to stop the engine 70 while the engine 70 is rotating after cranking (step 606), the system can be switched OFF (step 602) by pushing the switch 31 for a long time (step S7).

If it is desired to make a shift from the OFF state of the system with the unlocked steering wheel (step 602) to the OFF state of the system with the locked steering wheel (step 601), it is sufficient just to push the lock button 527 manually (see FIG. 3) (step S11).

Further, if it is desired to make a shift from the OFF state of the system with the locked steering wheel (step 601) to the ON state of the system with the cranking engine (step 604) by starting the engine at once, the switch 31 is pushed for a long time (the portable equipment 1 is authenticated) (step S4).

In response, the control circuit 22 turns the steering wheel unlocking means 52 and the system relay 6 ON and issues a cranking command to the engine control unit 8 almost simultaneously. As a result, a direct shift from the OFF state of the system (step 601) to the cranking state (step 604) can be made.

At this moment, since the control circuit 22 performs the processing of comparing the cipher code of the portable equipment 1 with the collation code only once, the time required for a shift to the starting mode can be reduced.

Referring to timing charts shown in FIGS. 5 and 6, it will now be described more specifically how the control circuit 22 in the on-vehicle equipment 2 operates depending on how long the switch is actuated (i.e., whether the switch 31 is pushed for a short time or for a long time).

Figure 5:
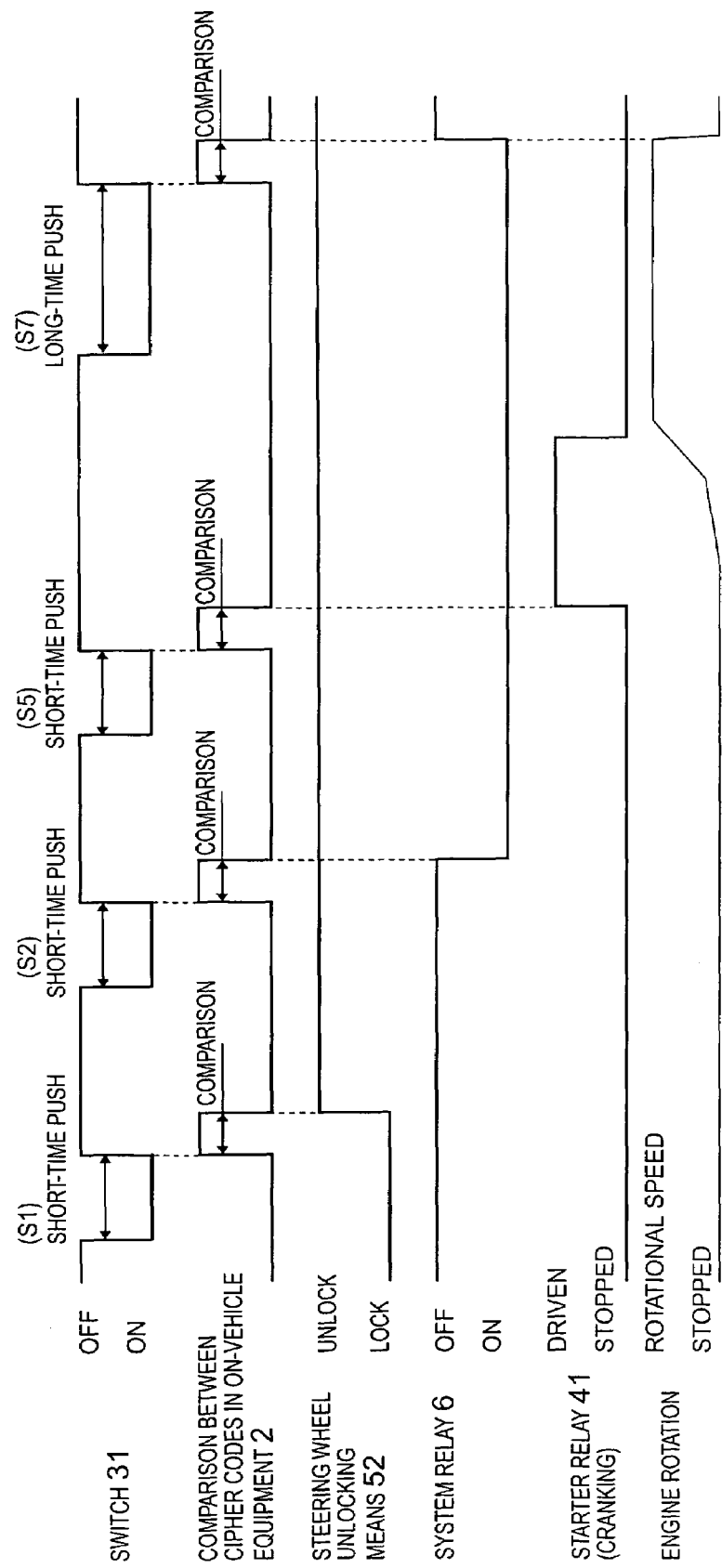
FIG. 5 is a timing chart showing how the engine starting system according to the first embodiment of the present invention operates when a switch is pushed for a short time.

FIG. 5 shows how the control circuit 22 operates when the switch 31 is sequentially actuated through a short-time push, and FIG. 6 shows how the control circuit 22 operates when the switch 31 is actuated through a long-time push.

In FIGS. 5 and 6, the actuation of the switch 31 by the user, the operation of comparing cipher codes in the on-vehicle equipment 2, the unlocking operation of the steering wheel unlocking means 52 by the control circuit 22, and the operation of activating and stopping the system relay 6 by the control circuit 22 are illustrated together with changes in the rotational speed of the engine 70.

Timings for actuating the switch 31 are shown in relation to the respective steps S1, S2, S4, S5, and S7 in FIG. 4.

First of all, as shown in FIG. 5, if the switch 31 is repeatedly and sequentially actuated for a short time (steps S1, S2, and S5) with the system being OFF and the steering wheel being locked, the control circuit 22 in the on-vehicle equipment 2 performs the processing of comparing cipher codes every time after the switch 31 has been actuated through a short-time push. If it is determined that the cipher codes coincide with each other, the control circuit 22 performs a processing corresponding to the timing of actuation.

That is, in response to the first actuation of the switch 31 through a short-time push (step S1), the control circuit 22 compares the cipher codes with each other and then performs the unlocking operation of the steering wheel unlocking means 52. In response to the subsequent actuation of the switch 31 through a short-time push (step S2), the control circuit 22 compares the cipher codes with each other and then turns the system relay 6 ON (activates the system relay 6).

Further, in response to the final actuation of the switch 31 through a short-time push (step S5), the control circuit 22 compares the cipher codes with each other and then performs cranking (starts the engine 70).

In addition, if the switch 31 is actuated through a long-time push (step S7) after activation of the system relay 6, the control circuit 22 compares the cipher codes with each other in response and then turns the system relay 6 OFF.

On the other hand, as shown in FIG. 6, if the switch 31 is actuated through a long-time push (step S4) with the system being OFF and the steering wheel being locked, the control circuit 22 compares the cipher codes with each other and then activates the system relay 6, performs the unlocking operation of the steering wheel unlocking means 52, and carries out cranking (starting of the engine 70) almost simultaneously.

In this case, since the processing of comparing cipher codes with each other in the on-vehicle equipment 2 is performed only once when the switch 31 is actuated through a long-time push (step S4), the time required for a shift to the starting mode can be reduced.

As described above, according to the first embodiment of the present invention, the use of a key and a key cylinder is abolished, and the unlocking of the steering wheel can be performed by using the portable equipment 1, so that there is no need to take the trouble to insert the key into the key cylinder and turn it therein, and, solely by pushing a single button mounted to the vehicle, it is possible to easily perform the unlocking of the steering wheel and give instructions regarding the permission of engine operation and the engine operation stop. Further, it is also possible to prevent mechanical failure that might be caused by the insertion of the key into the key cylinder.

Since the portable equipment 1 performs unlocking, when the authorized driver possesses the portable equipment 1, it is not possible for others to unlock the steering wheel or permit the operation of the engine 70. Hence, the theft of the vehicle is prevented when the driver leaves the vehicle with the key inserted into the key cylinder.

Further, since there is no need to insert the key into the key cylinder, the driver does not need to search for the insertion hole of the key cylinder in the darkness when starting the engine at night, and can easily unlock the steering wheel and start the engine.

Also, a low cost system may be provided as it is unnecessary to take the expensive measure of installing a lamp on the key cylinder.

Also, as the key cylinder itself can be eliminated, degree of freedom in regards to the design in proximal area of the driver's seat increases.

Further, the function of antitheft can further be improved by turning the steering wheel unlocking means 52 OFF and fixing a steering equipment (the steering wheel) of the vehicle in its rotational direction.

Also, in a state where the engine 70 is not allowed to operate by the control circuit 22, the oscillation sensor 56 detects oscillation of the vehicle at the time of theft, and the hazard lamps (not shown) via the hazard relay 54 or the alarm buzzer 55 are activated to raise the alarm by light or sound, whereby the driver and surrounding people are surely informed of an occurrence of theft thereby enhancing the antitheft function.

Further, when the engine 70 is shifted from the operating state to the stopped state, the control circuit 22 disables the engine 70 to operate. Thus, the restarting of the engine 70 can be rapidly inhibited after the stopped state of the engine, that is, OFF state of the system (step 602) to enhance the antitheft function.

Further, when, after the permission of starting the engine 70, the engine stall continues for a predetermined period of time T [seconds] or longer, the control circuit 22 turns the system relay 6 OFF to prohibit engine start, so that it is more difficult to steal the vehicle when the driver is away from it for a short just before driving, thus achieving a further improvement in terms of antitheft function.

As described above, according to the first embodiment of the present invention, the vehicle-side transmitter-receivers 20 and 21 in the on-vehicle equipment 2 and the portable transmitter-receivers 10 and 11 in the portable equipment 1 are constructed to allow bidirectional communication. In response to an actuation signal of the switch 31, an inquiry signal (collation code) is transmitted from the on-vehicle transmitter-receivers 20 and 21, and an answer signal (cipher code) for the inquiry signal is transmitted from the portable transmitter-receivers 10 and 11. If the answer signal corresponds to the inquiry signal, the control circuit 22 allows the steering wheel locking means to be unlocked and the engine 70 to be started, and unlocks the steering wheel locking means, turns the power source of the vehicle (system) ON, or performs a cranking operation (starting of the engine 70) depending on how many times and how long the switch 31 is actuated. Various operations can thereby be performed by actuating the single switch 31.

Especially in the case where the present invention is applied to a two-wheeled vehicle requiring cost reduction, an antitheft system can be realized inexpensively and a striking effect is gained.

Although the first embodiment has been described with reference to the example in which the present invention is applied to the two-wheeled vehicle, it goes without saying that the present invention is applicable to any other propelled object (automobile, ATV, marine vessel, jet-propelled launch, or the like).

What is claimed is:

1. An engine starting system for authentically starting an engine installed in a propelled object, comprising:
   power source activation means installed in the propelled object;
   an engine control unit;
   a propelled-object-side equipment;
   steering wheel locking means;
   alarm means;
   a switch that can be actuated manually; and
   a portable equipment possessed by a driver of the propelled object,
      the portable equipment including:
      a portable transmitter-receiver for establishing bidirectional communication with the propelled-object-side equipment;
      a portable-equipment-side memory circuit in which a proper cipher code corresponding to the propelled object is stored; and
      a portable-equipment-side control circuit that receives a signal transmitted from the propelled-object-side equipment, reads out the cipher code, and transmits the cipher code to the propelled-object-side equipment,
      the propelled-object-side equipment including:
      a propelled-object-side transmitter-receiver for establishing bidirectional communication with the portable equipment;
      a propelled-object-side memory circuit in which a proper cipher code corresponding to the propelled object is stored as a collation code; and
      a propelled-object-side control circuit that reads out the collation code in response to an actuation signal of the switch, transmits the collation code to the portable equipment, and controls the engine control unit, the steering wheel locking means, and the alarm means in accordance with a result of comparison between the cipher code received from the portable equipment and the collation code, wherein the propelled-object-side transmitter-receiver transmits an inquiry signal including the collation code to the portable transmitter-receiver in response to an actuation signal of the switch, wherein the portable transmitter-receiver transmits an answer signal including the cipher code corresponding to the inquiry signal to the propelled-object-side transmitter-receiver, wherein the propelled-object-side control circuit unlocks the steering wheel locking means and permits the engine to be started if the answer signal corresponds to the inquiry signal, and wherein the propelled-object-side control circuit unlocks the steering wheel locking means, turns the power source activation means ON, or performs a cranking operation by the engine control unit depending on how many times and how long the switch is actuated.

2. An engine starting system according to claim 1, wherein the switch comprises a push-button switch.

3. An engine starting system according to claim 2, wherein the switch is actuated for a relatively short time and the propelled-object-side control circuit performs the respective operations in a sequentially shifted manner depending on how many times the switch is actuated through a short-time push.

4. An engine starting system according to claim 3, wherein the propelled-object-side control circuit determines how the inquiry signal corresponds to the answer signal every time the switch is actuated through a short-time push.

5. An engine starting system according to claim 2, wherein the switch is actuated for a relatively long time and the propelled-object-side control circuit almost simultaneously performs the respective operations in a continuously shifted manner depending on how many times the switch is actuated through a long-time push.

6. An engine starting system according to claim 4, wherein the propelled-object-side control circuit determines how the inquiry signal corresponds to the answer signal only once in response to actuation of the switch through a long-time push.

7. An engine starting system according to claim 1, wherein the propelled-object-side control circuit turns the power source activation means OFF and performs control to stop the engine in response to an actuation signal of the switch.

8. An engine starting system according to claim 1, wherein the propelled object comprises a two-wheeled vehicle.

* * * * *